(12) United States Patent
Chakraborty

(10) Patent No.: US 6,529,641 B1
(45) Date of Patent: Mar. 4, 2003

(54) METHOD FOR DESKEWING A SCANNED TEXT IMAGE

(75) Inventor: Anirudha Chakraborty, Cambirdge, MA (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/429,968

(22) Filed: Oct. 29, 1999

(51) Int. Cl.⁷ .............................. G06K 9/32; G06T 3/60
(52) U.S. Cl. ....................................................... 382/296
(58) Field of Search ................................. 382/176, 289, 382/290, 296, 254, 162, 190; 345/649

(56) References Cited

U.S. PATENT DOCUMENTS

| | | | | |
|---|---|---|---|---|
| 5,568,571 A | * | 10/1996 | Willis et al. | 382/254 |
| 5,594,815 A | * | 1/1997 | Fast et al. | 382/254 |
| 5,809,167 A | * | 9/1998 | Al-Hussein | 382/190 |
| 5,818,978 A | * | 10/1998 | Al-Hussein | 382/296 |
| 6,246,791 B1 | * | 6/2001 | Kurzweil et al. | 382/162 |
| 6,282,326 B1 | * | 8/2001 | Lee et al. | 382/289 |
| 6,310,984 B2 | * | 10/2001 | Sansom-Wai et al. | 382/289 |
| 6,430,320 B1 | * | 8/2002 | Jia et al. | 382/289 |

* cited by examiner

Primary Examiner—Jon Chang
Assistant Examiner—Brian Le
(74) Attorney, Agent, or Firm—Nelson Adrian Blish

(57) ABSTRACT

A method for deskewing a scanned text image is disclosed. The method comprises the steps of:

a) determining a first intensity level for each line of the image with the image in an original position;

b) determining which of the lines has a highest intensity level and which of the lines has a lowest intensity level;

c) adding a relaxation factor to the lowest intensity level to establish a lower threshold;

d) subtracting the relaxation factor from the highest intensity level to establish an upper threshold;

e) determining a first value equal to a sum of lines having a first intensity level above the upper threshold and lines having a first intensity level below the lower threshold;

f) rotating the image by a first amount in a first direction to a first position;

In one embodiment, the relaxation factor is ten percent.

12 Claims, 2 Drawing Sheets

METHOD FOR DESKEWING A SCANNED TEXT IMAGE

FIELD OF THE INVENTION

This invention relates in general to scanning documents for use with an optical character recognition (OCR) software program and in particular to deskewing an image containing text.

BACKGROUND OF THE INVENTION

It is well known that documents containing text may be scanned using a flatbed scanner or rotary-type scanner to produce a digitized image of the document. If the document contains text, an optical character recognition (OCR) software program may be used to decipher the text contained in the scanned document. This process allows typed documents to be modified without having to be retyped.

A problem that is often encountered is that the document being scanned is skewed at an angle to the scanner, i.e., the document may be oriented at an angle on the flatbed scanner, or the paper containing the document may be fed at an angle on a high speed scanner with an automatic sheet feed. These skewed images are unattractive when displayed onscreen and, more important, may affect the accuracy of OCR software programs designed to decipher the text contained in the document.

Prior art attempts to solve this problem have required the user of the software program to construct a line onscreen with a pointing device, which matches the angle of skew of the lines in the document. The user then invokes a software program which straightens the line drawn onscreen and hence, the remaining lines of text in the document. This method, however, involves active participation of the user, and is relatively slow. It is desirable to have a software program which automatically checks and corrects the skew angle of scanned documents.

SUMMARY OF THE INVENTION

It is an object of the invention to provide a method for automatically deskewing a text image. The present invention is directed to overcoming one or more of the problems set forth above.

The above and other objects are accomplished by a method for deskewing a text image. Briefly summarized according to one aspect of the present invention the method comprises the steps of:

a) determining a first intensity level for each line of a scanned image, with the image in an original position;

b) determining which of the lines has a highest intensity level and which of the lines has a lowest intensity level;

c) adding a relaxation factor to the lowest intensity level to establish a lower threshold;

d) subtracting the relaxation factor from the highest intensity level to establish an upper threshold;

e) determining a first value equal to a sum of lines having a first intensity level above the upper threshold and lines having a first intensity level below the lower threshold;

f) rotating the image by a first amount in a first direction to a first position;

g) determining a second intensity level for each line of the rotated image;

h) determining a second value equal to a sum of lines having a second intensity level above the upper threshold and lines having a second intensity level below said lower threshold;

i) rotating said image by a second amount in a second direction to a second position;

j) determining a third intensity level for each line of the rotated image;

k) determining a third value equal to a sum of lines having a third intensity level above the upper threshold and lines having a third intensity level below the lower threshold for said rotated image;

l) if the first value is greater than the second value or the third value, rotate the image to the original position and exit program, if not proceed to step m;

m) determining if the first amount is greater than a granularity factor, if yes, go to step n, if not rotate the image to the original position and exit program;

n) determining whether the first value or the second value is greater and set the position associated with the greater value as the original position;

o) setting the first amount to one half of previous value;

p) setting the second amount to one half of previous value; and q) returning to step e.

In one embodiment of the invention, the first amount and second amount are six degrees. In another embodiment, the granularity factor is one degree. In yet another embodiment, the relaxation factor is 10 percent.

The above, and other objects, advantages and novel features of the present invention will become more apparent from the accompanying detailed description thereof when considered in conjunction with the following drawings.

DETAILED DESCRIPTION OF THE INVENTION

The present description will be directed in particular to elements forming part of, or in cooperation more directly with, the method in accordance with the present invention. It is understood that elements not specifically shown or described may take various forms well known to those skilled in the art.

Figure 1A:
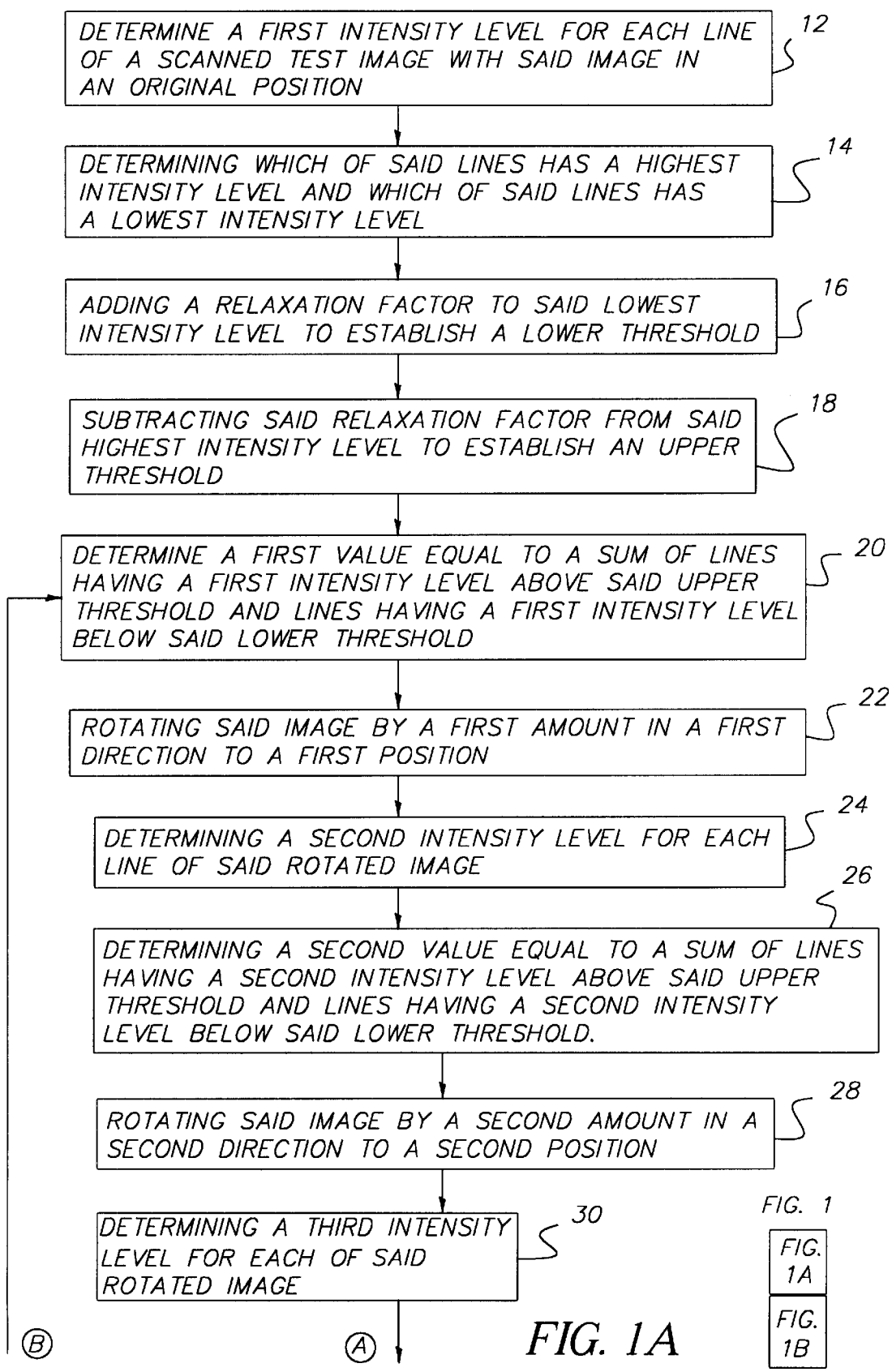
FIG. 1 is a flow chart showing the steps for deskewing a text image.
Figure 1B:
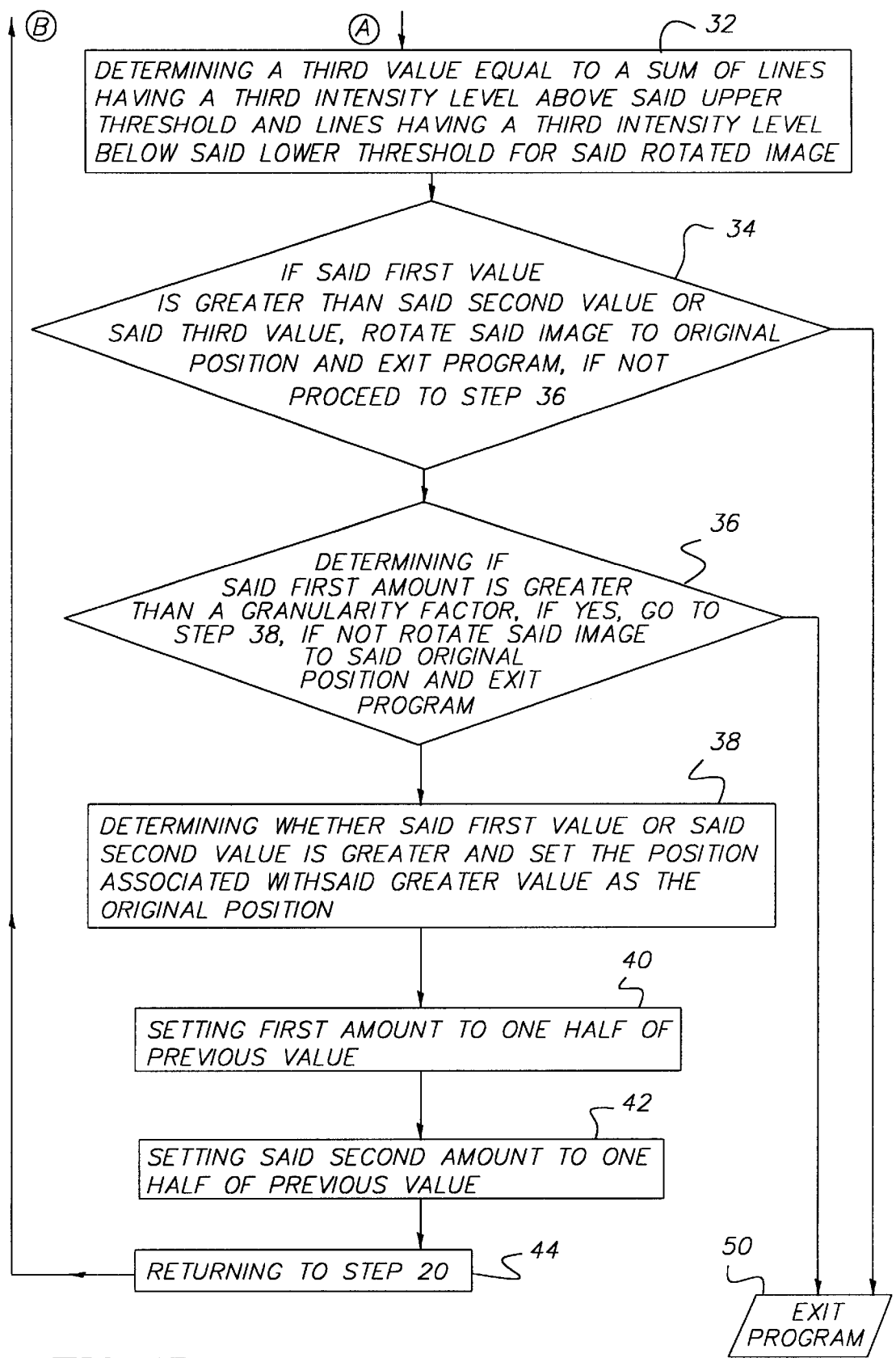

FIG. 1 is a flow chart 10 of the invention. It should be understood that the invention is not restricted to either text documents or tables, however, best results will be obtained with images that contain some text characters, or which have discernible straight lines. The lines may be formed by the layout of the text characters.

The process begins by determining the intensity of each line in a scanned image 12 and determining a highest and a lowest intensity level for each line in the image 14. For example, in a black-and-white image, count the number of black bits in a line and make that the black or lower threshold, and count the number of white bits and make that the white or upper threshold. Next, relax the threshold by adding a relaxation factor, for example 10 percent, to the upper threshold, step 16, and subtracting 10 percent from the lower threshold, step 18. This is to allow for the fact that the current image is probably crooked.

Next, a determination is made of the number of lines in the current image which fall within this threshold. This is done by determining a first value equal to a sum of lines having a first intensity level above the upper threshold and lines having a first intensity level below the lower threshold, step 20. This number is called Xcurrent. Rotate the image by a predetermined first amount, for example, 6 degrees to the right, step 22, and count the intensity of the lines in the new image, step 24. Determine how many lines fall within the upper and lower threshold, step 26. This number is called Xright. Next, rotate the image a predetermined second amount, for example 6 degrees, to the left of the original position, step 28, and determine a third intensity level for each line, step 30. Determine a third value equal to a sum of lines having a third intensity level above the upper threshold and lines having a third intensity value below the upper threshold for the rotated image, step 32. This value is called Xleft.

If Xcurrent is greater than Xleft or Xright, then the image is straight with respect to the scanner boundaries and requires no deskewing. If the predetermined amount in step 22 is greater than a selected granularity factor, for example, 1 degree, step 34, then the process continues at step 36. However, if the predetermined amount in step 22 is less than a granularity factor the process is complete and no further deskewing is necessary and the program is ended, step 50.

A determination is made as to whether Xleft or Xright is the greater value. For example if Xright is the greatest value, then the image is rotated 6 degrees to the right. The rotational value is set at one half the predetermined first amount of rotation, step 40. In the example used, the value is reset at 3 degrees. The predetermined second amount of rotational value in this example, Xleft, is also set at one half of the previous value step, step 42.

The process is repeated starting with step 22 as many times as needed based on the accuracy or granularity of the straighten needed, step 44. As soon as Xcurrent becomes greater than Xright or Xleft, exit the program, step 50. Setting the initial angle to different values will increase or decrease the range of the autodeskew. Setting this value to a high number will compromise on accuracy. For example, with an initial angle of 6 degrees and a granularity of 1 degree, the range is 6+3+1.5+0.75=11.25 degrees.

The method described makes the assumption that in a straight image, there will be many lines with either a high text content or a low or null text content, but not much in between. This is evident in most text documents, where a line of text is followed by a white line or space and then additional lines of text.

It will be understood that various other changes and modifications may be made without departing form the scope of the present invention. For example, although the term "text" is used throughout the detailed description of the invention, the invention is intended to cover columns of numbers, combinations of alpha numeric symbols, and spreadsheets.

What is claimed is:

1. A method for deskewing a scanned text image comprising the steps of:
   a) determining a first intensity level for each line of said image with said image in an original position;
   b) determining which of said lines has a highest intensity level and which of said lines has a lowest intensity level;
   c) adding a relaxation factor to said lowest intensity level to establish a lower threshold;
   d) subtracting said relaxation factor from said highest intensity level to establish an upper threshold;
   e) determining a first value equal to a sum of lines having a first intensity level above said upper threshold and lines having a first intensity level below said lower threshold;
   f) rotating said image by a first amount in a first direction to a first position;
   g) determining a second intensity level for each line of said rotated image;
   h) determining a second value equal to a sum of lines having a second intensity level above said upper threshold and lines having a second intensity level below said lower threshold;
   i) rotating said image by a second amount in a second direction to a second position;
   j) determining a third intensity level for each line of said rotated image;
   k) determining a third value equal to a sum of lines having a third intensity level above said upper threshold and lines having a third intensity level below said lower threshold for said rotated image;
   l) if said first value is greater than said second value or said third value, rotate said image to said original position and exit program, if not proceed to step m;
   m) determining if said first amount is greater than a granularity factor, if yes, go to step n, if not rotate said image to said original position and exit program;
   n) determining whether said first value or said second value is greater and set the position associated with said greater value as the original position;
   o) setting said first amount to one half of previous value;
   p) setting said second amount to one half of previous value;
   q) returning to step e.

2. A method for deskewing a scanned text image as in claim 1 wherein said first amount is six degrees.

3. A method for deskewing a scanned text image as in claim 1 wherein said second amount is 12° degrees.

4. A method for deskewing a scanned text image as in claim 1 wherein said second amount is equal to twice said first amount.

5. A method for deskewing a scanned text image as in claim 1 wherein said granularity factor is one degree.

6. A method for deskewing a scanned text image as in claim 1 wherein said relaxation factor is ten percent.

7. A method for deskewing a scanned text image comprising the steps of:
   a) determining a first intensity level for each line of said image with said image in an original position;
   b) determining which of said lines has a highest intensity level and which of said lines has a lowest intensity level;
   c) adding a relaxation factor to said lowest intensity level to establish a lower threshold;
   d) subtracting said relaxation factor from said highest intensity level to establish an upper threshold;
   e) determining a first value equal to a sum of lines having a first intensity level above said upper threshold and lines having a first intensity level below said lower threshold;
   f) rotating said image by a first amount in a first direction to a first position;
   g) determining a second intensity level for each line of said rotated image;
   h) determining a second value equal to a sum of lines having a second intensity level above said upper threshold and lines having a second intensity level below said lower threshold;

i) rotating said image by a second amount in a second direction to a second position;

j) determining a third intensity level for each line of said rotated image;

k) determining a third value equal to a sum of lines having a third intensity level above said upper threshold lines having a third intensity level below said lower threshold for said rotated image;

l) if said first value is greater than said second value or said third value, rotate said image to said original position and exit program, if not proceed to step m;

m) determining if said first amount is greater than a granularity factor, if yes, go to step n, if not rotate said image to said original position and exit program;

n) determining whether said first value or said second value is greater and set the position associated with said greater value as the original position;

o) setting said first amount to a first predetermined fraction of previous value;

p) setting said second amount to a second predetermined fraction of previous value;

q) returning to steps e.

8. A method for deskewing a scanned text image as in claim 7 wherein said first predetermined fraction is fifty percent.

9. A method for deskewing a scanned text image as in claim 7 wherein said second predetermined fraction is fifty percent.

10. A method for deskewing a scanned text image as in claim 7 wherein said second predetermined fractions is equal to twice said first predetermined fraction.

11. A method for deskewing a scanned text image as in claim 7 wherein said image is digital image produced by scanning a document.

12. A method for deskewing a scanned text image as in claim 7 wherein steps a through q are performed by a computer.

* * * * *